United States Patent [19]
Giuliani

[11] 4,089,504
[45] May 16, 1978

[54] VALVE CONSTRUCTION

[76] Inventor: Robert L. Giuliani, 45310 Akimala Pl., Kaneohe, Hi. 96744

[21] Appl. No.: 747,718

[22] Filed: Dec. 6, 1976

[51] Int. Cl.² ........................................... F16K 25/00
[52] U.S. Cl. .................................... 251/86; 251/189; 251/191
[58] Field of Search .......................... 251/86, 189, 191

[56] References Cited

U.S. PATENT DOCUMENTS

| | | | |
|---|---|---|---|
| 1,226,040 | 5/1917 | Whitbeck | 251/86 |
| 1,779,893 | 10/1930 | Schmitz | 251/191 |
| 1,781,224 | 11/1930 | Gilg | 251/191 |
| 2,919,887 | 1/1960 | Patterson | 251/191 X |
| 3,211,419 | 10/1965 | Kliuger-Lohr | 251/191 X |

*Primary Examiner*—Harold W. Weakley
*Attorney, Agent, or Firm*—Flehr, Hohbach, Test, Albritton & Herbert

[57] ABSTRACT

A valve having improved sealing means making use of a sealing member of resilient material which is compressed radially when the valve is closed. Compression causes the peripheral surface of the sealing member to be pressed into sealing engagement with a cylindrical seating surface carried by the valve body. Rigid compression members are disposed on opposite sides of the sealing member, and one of these members limits compression of the sealing member when the valve is closed.

4 Claims, 3 Drawing Figures

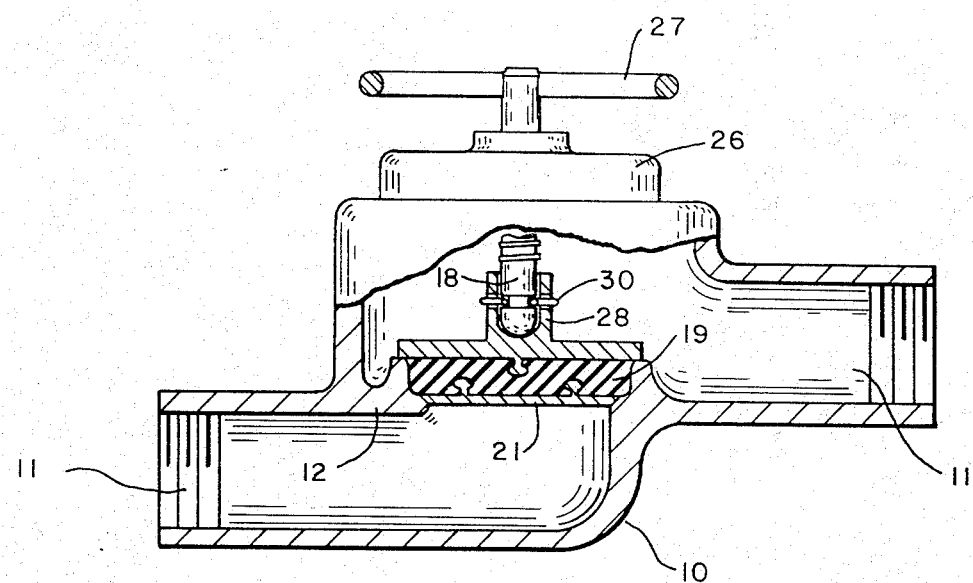
FIG.—1

VALVE CONSTRUCTION

BACKGROUND OF THE INVENTION

This invention relates generally to the construction of valves for controlling fluid flow.

Conventional valves such as are employed for controlling flow of liquids and gases employ a body having flow passages and a valve seat located between the passages. A valve assembly is adapted to be moved from an open or retracted position spaced from the seat to a closed position in sealing engagement with the seat. The sealing surfaces of the seat may be flat or conical shaped. The movable valve assembly may be constructed to have metal-to-metal sealing engagement with the seat, or it may have a member of resilient material (e.g., natural or synthetic rubber or elastomer) adapted to engage the seating surfaces to provide a seal. Such a valve is subject to deterioration due to damage that may occur to the resilient member. For example, the resilient sealing member may become permanently distorted, worn or mutilated in such a manner as to prevent an effective seal. Some valves have been constructed with cylindrical seating surfaces and with a movable valve assembly which has a resilient member that engages the cylindrical seating surface for closed valve position. Such valves likewise have disadvantages, including wear of the resilient parts in operating the valve, and constructions that are relatively expensive to manufacture.

OBJECTS AND SUMMARY OF THE INVENTION

This invention relates generally to an improved valve construction which overcomes the disadvantages of prior valves as outlined above.

Another object is to provide a valve which makes use of resilient material but which is relatively free of wear or injury, and which requires a minimum of maintenance.

Another object is to provide a valve construction which is relatively simple and inexpensive to manufacture.

In general, the present invention consists of a body having flow passages and valve seating means between the passages. A movable valve assembly is carried by operating means whereby it is moved in opposite directions between open and closed seal positions. The seat means consists of a portion secured to the body formed to provide a cylindrical surface surrounding the seat opening and in alignment with the valve assembly. The seat portion is also formed to provide an inwardly extending annular shoulder or secondary seat at one end of the cylindrical surface. The valve assembly consists of an annular sealing member of resilient material which is so dimensioned that it interfits the cylindrical surface when it is relaxed. Rigid annular compression members are disposed on the two sides of the sealing member. One of the rigid members is annular and dimensioned to be accommodated within the cylindrical surface and to engage the shoulder when the assembly is moved to closed valve position. Closing force applied by the operating means after engagement of the one rigid member with the shoulder serves to compress and to radially expand the sealing member to press the periphery of the same into tight sealing contact with the cylindrical surface. Preferably the other rigid member serves to limit the compression of the sealing member when the valve is moved to full closed position.

Additional objects and features of the invention will appear from the following description in which the preferred embodiment has been set forth in detail in conjunction with the accompanying drawing.

BRIEF DESCRIPTION OF THE DRAWING

FIG. 1 is a side elevation view partly in section illustrating a valve incorporating the present invention.

FIG. 2 is an enlarged detail in section illustrating the movable valve assembly and the manner in which it cooperates with the seating surface.

FIG. 3 is a detail in section illustrating the means for attaching the operating stem to the valve assembly.

DESCRIPTION OF THE PREFERRED EMBODIMENTS

The valve illustrated in the drawing consists of a body 10 provided with flow passages 11. Between the flow passages there is seating means consisting of an annular portion 12 carried by the body and provided with a generally cylindrical seating surface 13. Portion 12 is also provided with an annular shoulder 14 which is at the lower extremity of the cylindrical seating surface 13, and which preferably is provided with a secondary conical shaped seating surface 16.

A valve assembly 17 is carried by the operating stem 18 and is adapted to be moved between open and closed positions relative to the seating surfaces 13 and 16. The assembly 17 consists of an annular member 19 made of suitable resilient compressible material such as natural or synthetic rubber or a suitable elastomer. Member 19 is interposed between the rigid annular members 20 and 21. Member 20 has a diameter somewhat greater than the diameter of the cylindrical seating surface 13, while the member 21 has a diameter slightly less than the diameter of the surface 13, but such that its peripheral margin engages the shoulder 14. The periphery of the member 21 preferably is formed conical shaped to engage with the conical surface 16.

FIG. 2 illustrates the resilient member 18 when relaxed. Its thickness is somewhat greater than the distance between the surface 22 on portion 12 and the rigid member 21 when seated upon the surface 16. Its diameter is comparable to or slightly smaller than the diameter of the cylindrical surface 13 whereby when relaxed it can be readily moved into and out of the cylindrical surface.

The means employed for retaining members 19, 20 and 21 assembled in the manner shown in FIG. 2 preferably employs studs 23 fixed to the rigid member 21 and studs 24 fixed to the member 20. The resilient member 19 is provided with cavities into which the studs engage. It will be noted that the studs have enlarged heads whereby when thrust into the accommodating recesses by distortion of the resilient material, they are retained in the manner as shown in FIG. 2, without the use of attaching means extending entirely through the resilient member.

The operating stem 18 is shown extending through a suitable bonnet 26 which is provided with means to prevent leakage past the stem. The stem is shown provided with threads engaging a nut (not shown) carried by the bonnet means to effect movements of the valve member when the stem and hand wheel 27 are rotated.

The inner end of the stem 18 is preferably secured to the valve assembly in such a manner that the stem may rotate without causing rotation of the assembly. Thus a sleeve 28 fixed to the rigid member 20 provides a socket for receiving the lower end of the stem 18, and the stem is shown provided with a groove 29 which is engaged by a retaining clip 30 of spring wire.

Operation of the valve is as follows. When the valve is in open position with the valve assembly raised above the seat, the resilient member 19 is relaxed, and its diameter is comparable to the diameter of the cylindrical surface 13. When the valve is closed, the stem is rotated to advance the assembly into the cylindrical surface 13, initially in the manner shown in FIG. 2. When in this position, the rigid member 21 has its periphery engaging the seating surface 16, thereby forming an approximate or secondary seal. Further closing movement by turning the stem 18 causes the rigid member 21 to be moved until its peripheral margin engages the surface 22, and during this movement the resilient member 18 is compressed whereby it is caused to expand radially and to be pressed into tight sealing engagement with the cylindrical surface 13. Engagement of the margin of member 20 with the surface 22 not only limits the extent of closing movement, but also limits the amount of compression that can be applied to the resilient member 18, thus avoiding possible injury due to excessive compression. When the stem is turned to open the valve, the initial movement raises the member 20 while member 21 remains in engagement with seating surface 16. During this movement the resilient member 19 is relaxed and its peripheral surface is retracted from sealing engagement with the cylindrical surface 13. Further opening movement serves to retract the resilient member 19 together with the rigid member 21 from the sealing surface 13 until the assembly reaches full open position.

The valve described above has a number of inherent advantages. Since the relaxed resilient member 19 moves freely into and out of the cylindrical surface 13, such movements do not cause any undue wear. Closing the valve with excessive force does not cause any undue injury or mutilation of the resilient sealing member, since the amount of compression that can be applied to the resilient member is limited. The overall construction of the valve is relatively simple and it is relatively inexpensive to manufacture. If it does become necessary to replace the resilient member 18, this can be readily done by separating the resilient member from the rigid members 19 and 20 and applying a new resilient member in the manner previously described.

What is claimed is:

1. In a valve construction, a body having flow passages, valve seat means disposed between the passages and having an opening communicating between the passages for open condition of the valve, a movable valve assembly, and operating means connected to the assembly operable to move the assembly in opposite directions between open and closed sealed positions relatively to the seat means, the seat means comprising a portion secured to the body and formed to provide a substantially cylindrical surface surrounding said opening in alignment with the valve assembly, said portion also being formed to provide an inwardly extending annular shoulder at one end of the cylindrical surface, the valve assembly comprising an annular sealing member of resilient material dimensioned when relaxed to interfit the cylindrical surface, and rigid annular compression members disposed on opposite sides of the sealing member, one of said rigid members being dimensioned to be accommodated within the cylindrical surface and to engage said shoulder when the sealing member is moved into the cylindrical surface, closing forces applied by the operating means after engagement of the one rigid member with the shoulder serving to compress and to radially expand the sealing member to press the periphery of the same into sealing contact with the cylindrical surface, said shoulder having an annular conical seating surface adapted to engage a conical surface formed on the periphery of the one compression member, the other compression member having a diameter greater than the diameter of the cylindrical surface and engaging said seating means at the other end of the cylindrical surface for closed and sealed position of the valve assembly thereby to limit compression of the sealing member.

2. A valve as in claim 1 in which portions of the sealing member are removably secured to the one compression member and other portions of the sealing member are removably secured to the other compression member.

3. A valve construction as in claim 2 in which the sealing member is secured to the compression members by studs fixed to the compression members and having enlarged heads, the sealing member having cavities that extend partially through the sealing member and which accommodate and retain the studs by distortion of the material.

4. In a valve construction, a body having flow passages, valve seat means disposed between the passages and having an opening communicating between the passages for open condition of the valve, a movable valve assembly, and operating means connected to the assembly operable to move the assembly in opposite directions between open and closed sealed positions relatively to the seat means, the seat means comprising a portion secured to the body and formed to provide a substantially cylindrical surface surrounding said opening in alignment with the valve assembly, said portion also being formed to provide an inwardly extending annular shoulder at one end of the cylindrical surface, the valve assembly comprising an annular sealing member of resilient material dimensioned when relaxed to interfit the cylindrical surface, and rigid annular compression members disposed on opposite sides of the sealing member, one of said rigid members being dimensioned to be accommodated within the cylindrical surface and to engage said shoulder when the sealing member is moved into the cylindrical surface, closing forces applied by the operating means after engagement of the one rigid member with the shoulder serving to compress and to radially expand the sealing member to press the periphery of the same into sealing contact with the cylindrical surface, the sealing member being removably secured to the compression members by studs fixed to the compression members and having enlarged heads, the sealing member having cavities that extend partially through the sealing member and which accommodate and retain the studs by distortion of the material.

* * * * *

UNITED STATES PATENT OFFICE
CERTIFICATE OF CORRECTION

Patent No. 4,089,504             Dated May 16, 1978

Inventor(s) Robert L. Giuliani

It is certified that error appears in the above-identified patent and that said Letters Patent are hereby corrected as shown below:

The sheet of drawing containing Fig. 1 should be canceled and the attached sheet of drawing containing Figs. 1, 2 and 3 substituted therefor.

Signed and Sealed this

Fifth Day of June 1979

[SEAL]

Attest:

RUTH C. MASON
Attesting Officer

DONALD W. BANNER
Commissioner of Patents and Trademarks

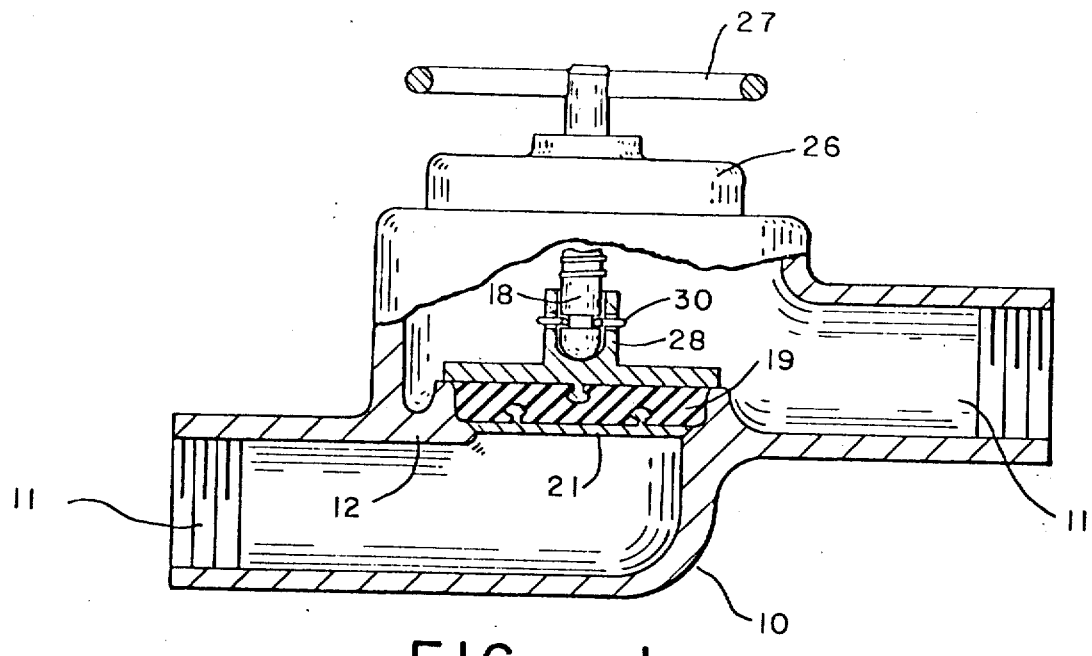
FIG.—1
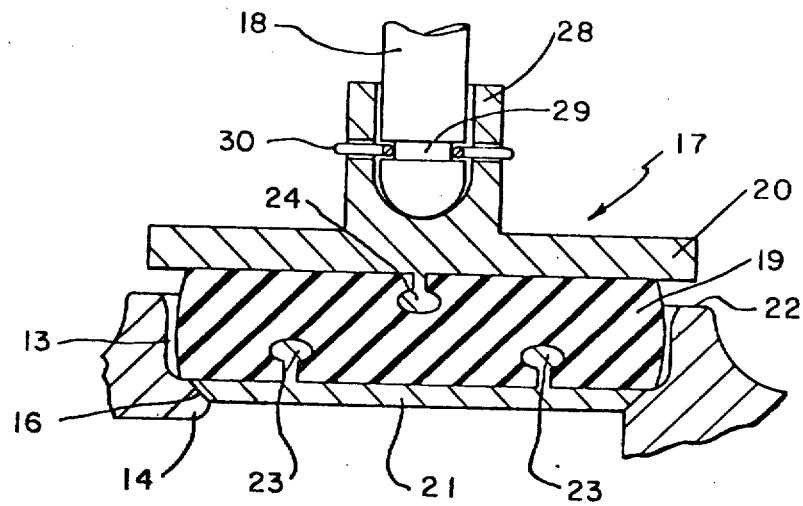
FIG.—2
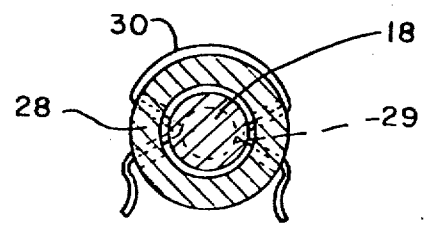
FIG.—3